W. M. ANDERSON.
COMBINED LOCK SLEEVE AND DUST CAP.
APPLICATION FILED FEB. 11, 1920.
1,370,395. Patented Mar. 1, 1921
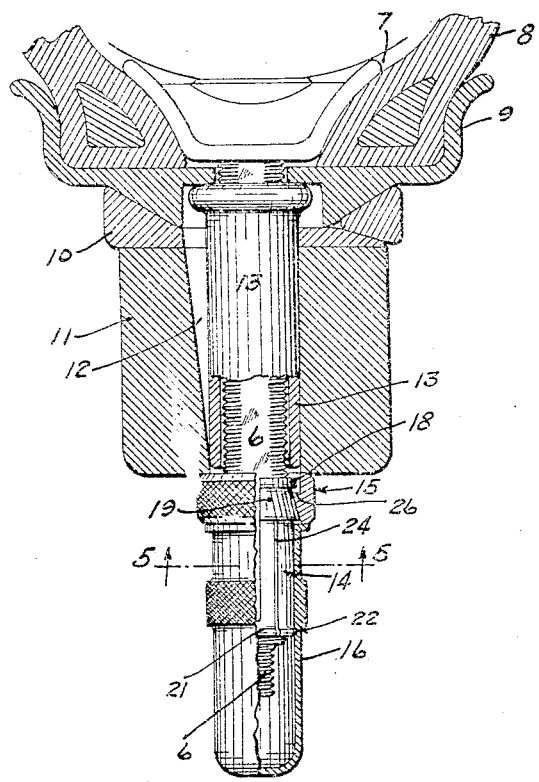
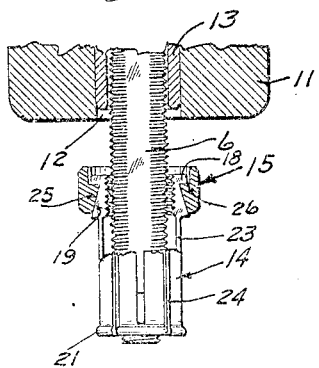
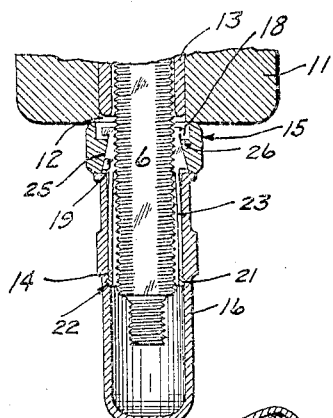
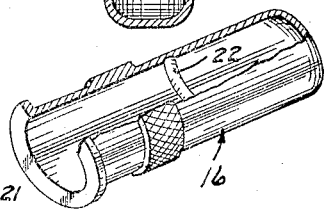
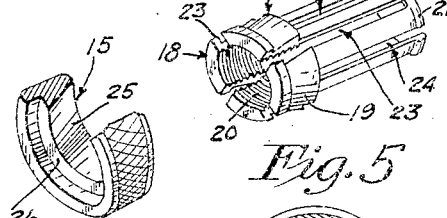
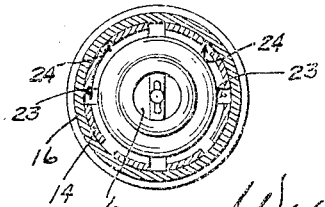
Inventor
William M. Anderson
By his Attorneys

UNITED STATES PATENT OFFICE.

WILLIAM M. ANDERSON, OF MINNEAPOLIS, MINNESOTA.

COMBINED LOCK-SLEEVE AND DUST-CAP.

1,370,395.

Specification of Letters Patent.

Patented Mar. 1, 1921.

Application filed February 11, 1920. Serial No. 358,001.

*To all whom it may concern:*

Be it known that I, WILLIAM M. ANDERSON, a citizen of the United States, residing at Minneapolis, in the county of Hennepin and State of Minnesota, have invented certain new and useful Improvements in Combined Lock-Sleeves and Dust-Caps, and I do hereby declare the following to be a full, clear, and exact description of the invention, such as will enable others skilled in the art to which it appertains to make and use the same.

My invention has for its object to provide a simple and highly efficient combined lock-sleeve and dust-cap, which may be very quickly and easily applied to or removed from the valve stems of pneumatic tires and the like, and is intended to take the place of the independent lock-nut and dust-cap now commonly used.

To the above end, the invention consists of the novel devices and combinations of devices hereinafter described and defined in the claims.

In the accompanying drawings, which illustrate the invention, like characters indicate like parts throughout the several views.

Referring to the drawings:

Figure 1 is a view partly in elevation and partly in transverse radial section, illustrating the invention applied to the valve stem of a pneumatic tire mounted on a demountable rim of an automobile wheel;

Fig. 2 is a fragmentary detail view illustrating the lock-sleeve as the same is applied or removed from the valve stem;

Fig. 3 is a sectional view of the lock-sleeve and dust-cap as the same appear applied to the valve stem, as in Fig. 1;

Fig. 4 is a perspective view of the several members of the lock-sleeve and dust-cap separated and with some parts broken away and sectioned; and Fig. 5 is a view partly in elevation and partly in transverse section taken on the line 5—5 of Fig. 1.

The invention is shown as applied to an externally screw-threaded valve stem 6 attached to the inner tube 7 of a pneumatic tire, the casing of which is indicated by the numeral 8. The pneumatic tire is mounted on a demountable rim 9 applied to the felly-band 10 of the felly 11 of an automobile wheel. Alined radial openings 12, for the valve stem 6, are formed in the rim 9, felly-band 10 and felly 11. Applied to the valve stem 6, within the openings 12, is a sleeve 13 provided for taking up lateral play of the valve stem and also to protect the same.

Applied to the inner projecting end portion of the valve stem 6, is the improved combined lock-sleeve and dust-cap, which comprises a lock-sleeve 14, a collar 15, and a dust-cap 16 adapted to be removably applied to said lock-sleeve. Formed on one end of the lock-sleeve 14 is a head 17 having an external annular flange 18, inward of which is a conical external surface 19. Within the head 17 are formed internal screw-threads 20, which, as best shown in Fig. 2, are oversize in respect to the screw-threads on the valve stem 6. These screw-threads 20, however, preferably have slight interlocking engagement with the screw-threads on the valve stem 6, so that when the lock-sleeve 14 is applied to said valve stem or removed therefrom by an axial movement of the lock-sleeve, the threads thereof ride over the screw-threads on the valve stem 6 with a spring action produced in the lock-sleeve 14, as will presently appear.

On the opposite end of the lock-sleeve 14, from the head 17, is an external annular lock-bead 21, adapted to enter an annular internal lock-groove 22 in the dust-cap 16 when said dust-cap is applied to said lock-sleeve to assist in holding the same thereon. The coöperating lock-bead 21 and lock-groove 22 are not absolutely necessary, for the reason that the said dust-cap is frictionally held on the lock-sleeve 14 with a yielding action, as will presently appear, and may be dispensed with if so desired. Cut in both ends of the lock-sleeve 14 are longitudinally extended, circumferentially spaced slits 23 and 24, and it is important to note that the inner end portions of said slits overlap, as best shown in Fig. 4.

The collar 14 is removably applied to the head 17 on the lock-sleeve 14, and is provided with an internal conical surface 25 arranged for coöperation with the conical surface 19 on the head 17, to contract said head when the sleeve 14 is moved axially into the collar 15 and thereby locks said sleeve to the valve stem 6 by pressing its screw-threads 20 into the screw-threads on the valve stem 6. An internal annular shoulder 26, in the collar 15, coöperates with the lock-flange 18 on the head 17 to lock said collar on the lock-sleeve 14 with freedom for complete rotary movement and a limited axial movement in respect thereto. To apply or remove the collar 15 to the lock-sleeve 14, it is only necessary to contract the head 17 on the said lock-sleeve by springing the sections thereof together sufficiently to cause the flange 18 to clear the lock-shoulder 26 in the collar 15.

In applying the lock-sleeve 14 to the valve stem 6, the dust-cap 16 is removed therefrom and said lock-sleeve telescoped onto the valve stem by a straight axial movement until stopped by the engagement of the collar 15 with the felly 11. This straight axial sliding movement of the lock-sleeve 14 on the valve stem 6, as previously stated, is permitted by the springing of the sections of the lock-sleeve to allow the screw-threads 20 to ride over the screw-threads on the valve stem 6. It will thus be seen that the lock-sleeve 14 is locked to the valve stem 6, whereever stopped thereon, by the interlocking screw-threads, with sufficient force to prevent the lock-sleeve 14 from being accidentally removed from the valve stem.

With the collar 15 engaging the felly 11, as a base of resistance, the lock-sleeve 14 may be moved axially toward the collar 15 to force its head 17 therein and thereby contract the same, under the action of the conical surfaces 19 and 25, to press the screw-threads 20 into the screw-threads on the valve stem 6. While the lock-sleeve 14 is thus held, the collar 15, which is externally knurled, may be rotated toward the right and the frictional engagement between the conical surfaces 19 and 25 will cause the lock-sleeve 14 to rotate with the collar 15, and the screw-threads 20, traveling in the screw-threads on the valve stem 6, will impart an axial movement to the lock-sleeve 14 and collar 15 and thereby force the collar against the felly 11 with a pressure which will securely lock the sleeve 14 to the sleeve stem 6.

The dust-cap 16 may then be telescoped onto the lock-sleeve 14, preferably with a slight turning movement to cause the same to slide more easily, until the lock-bead 21 enters the lock-groove 22, or in case said bead and groove are dispensed with, until the dust-cap 16 engages the collar 15. The external diameter of the lock-sleeve 14 is slightly over-size in respect to the internal diameter of the dust-cap 16, so that when the dust-cap 16 is telescoped onto the lock-sleeve, said lock-sleeve will be slightly contracted to frictionally hold said dust-cap thereon. This contracting of the lock-sleeve 14, by the application of the dust-cap 16 thereto, will also place the head 17, of the lock-sleeve 14, under strain to contract, and in case the collar 15 should work loose, the screw-threads 20 will still be held securely interlocked with the screw-threads on the valve stem 6 by the action of the dust-cap.

In case the dust-cap 16 should be lost and the collar 15 become loose, centrifugal force will tend to hold the lock-sleeve 14 and collar 15 on the valve stem 6, while the wheel to which the invention is applied, is in rotation, and in case the wheel should stop with the valve stem at the top thereof, the slight engagement of the screw-threads 20, on the valve stem 6, will still hold said lock-sleeve 14 and collar 15 on the valve stem. To further assist in holding the screw-threads 20 interlocked with the screw-threads on the valve stem 6, when said valve stem is in a depending position, the weight of the collar 15, acting through its conical surface 19 on the conical surface of the head 17, will tend to contract said head and prevent the same from expanding.

To remove the combined lock-sleeve and dust-cap 16 from the valve stem, it is only necessary to pull said dust-cap axially from the lock-sleeve 14 and then, by a slight turning movement of the collar 15 to the left, the lock-sleeve 14 is turned therewith to release the frictional engagement of the conical surfaces 19 and 25 and permit the head 17 to expand and thereby release the screw-threads 20 from the screw-threads on the valve stem 6 sufficiently to permit the lock-sleeve and collar to be withdrawn from the valve stem by a straight axial movement.

What I claim is:

1. A combined lock-sleeve and dust-cap for valve stems, including a sleeve having at one end a head with internal screw-threads, said sleeve being longitudinally slit at both ends, a collar applied to the head on the sleeve and operative to contract the same, and a dust-cap applied to the other end of the sleeve to contract the same.

2. A combined lock-sleeve and dust-cap for valve stems, including a sleeve having at one end a head with internal screw-threads, said sleeve being longitudinally slit at both ends, with the inner end portions of said slit extending past each other, a collar applied to the head of the sleeve and operative to contract the same, and a removable dust-cap applied to the other end of the sleeve and operative to contract both ends thereof.

3. A combined lock-sleeve and dust-cap for valve stems, including a sleeve having at one end a head with internal screw-threads, said sleeve having at each end a plurality of circumferentially spaced longitudinally extended slits, the inner end portions of which are extended past each other, a collar applied to the head of the sleeve and operative to contract the same, and a removable dust-cap applied to the other end of the lock-sleeve and operative to contract both ends thereof.

4. A combined lock-sleeve and dust-cap for valve stems, including a sleeve having at one end a head with internal screw-threads, said sleeve having at each end a plurality of circumferentially spaced longitudinally extended slits, the inner end portions of which are extended past each other, a collar applied to the head of the sleeve and operative to contract the same, and a removable dust-cap applied to the other end of the lock-sleeve and operative to contract both ends thereof, said collar and head having conical surfaces to frictionally connect the one with the other.

5. A combined lock-sleeve and dust-cap for valve stems, including a sleeve having at one end a head with internal screw-threads, said sleeve having at each end a plurality of circumferentially spaced longitudinally extended slits, the inner end portions of which are extended past each other, a collar applied to the head of the sleeve and operative to contract the same, and a removable dust-cap applied to the other end of the lock-sleeve and operative to contract both ends thereof, said collar and head having conical surfaces to frictionally connect the one with the other, said collar and sleeve being connected for independent rotary movement and with freedom for a limited axial movement in respect to each other.

In testimony whereof I affix my signature in presence of two witnesses.

WILLIAM M. ANDERSON.

Witnesses:
 EVA E. KÖNIG,
 HARRY D. KILGORE.